United States Patent
Fuse et al.

(10) Patent No.: US 10,767,538 B2
(45) Date of Patent: Sep. 8, 2020

(54) ENERGY CONVERSION DEVICE

(71) Applicant: DENSO CORPORATION, Kariya, Aichi-pref. (JP)

(72) Inventors: Takuya Fuse, Kariya (JP); Motohiko Ueda, Kariya (JP); Yasumasa Hagiwara, Kariya (JP); Yuichi Ohno, Nisshin (JP); Yukikatsu Ozaki, Nisshin (JP); Koichi Yanagisawa, Nisshin (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/371,172

(22) Filed: Apr. 1, 2019

(65) Prior Publication Data

US 2019/0226381 A1 Jul. 25, 2019

Related U.S. Application Data

(63) Continuation of application No. PCT/JP2017/030224, filed on Aug. 24, 2017.

(30) Foreign Application Priority Data

Oct. 6, 2016 (JP) .................................. 2016-198370

(51) Int. Cl.
  *F01N 5/02* (2006.01)
  *F03G 7/00* (2006.01)
  (Continued)

(52) U.S. Cl.
  CPC ............. *F01N 5/02* (2013.01); *F02G 1/0435* (2013.01); *F03G 7/00* (2013.01); *F03G 7/002* (2013.01);
  (Continued)

(58) Field of Classification Search
  CPC ...... F01N 5/02; F02G 1/0435; F02G 2243/54; F03G 7/00; F03G 7/002; F25B 2309/1402;
  (Continued)

(56) References Cited

U.S. PATENT DOCUMENTS 8,567,187 B2 * 10/2013 Nakamura ................ F02G 1/04
  60/517
8,931,286 B2 * 1/2015 Watanabe ............... F25B 9/145
  62/55.5

(Continued)

FOREIGN PATENT DOCUMENTS

JP  2005188402 A  7/2005
JP  2005188846 A  7/2005
  (Continued)

*Primary Examiner* — Jesse S Bogue
(74) *Attorney, Agent, or Firm* — Harness, Dickey & Pierce, P.L.C.

(57) ABSTRACT

An energy conversion device includes a first acoustic wave generator, a second acoustic wave generator, and an output unit which are provided in a pipe member. The first acoustic wave generator has a thermal energy generator configured to generate thermal energy from electric energy, and converts the thermal energy generated by the thermal energy generator into acoustic energy to generate acoustic wave in working gas by a self-excited thermo acoustic vibration. The second acoustic wave generator converts thermal energy supplied from a heat supply source into acoustic energy and generates acoustic wave in working gas by a self-excited thermo acoustic vibration. The output unit converts the acoustic energy of the acoustic waves from the first acoustic wave generator and the second acoustic wave generator into cold energy to output.

6 Claims, 8 Drawing Sheets

(51) Int. Cl.
*F02G 1/043* (2006.01)
*F25B 9/00* (2006.01)
*F25B 9/14* (2006.01)

(52) U.S. Cl.
CPC ............... *F25B 9/00* (2013.01); *F25B 9/145* (2013.01); *F02G 2243/54* (2013.01); *F25B 2309/1402* (2013.01); *F25B 2309/1403* (2013.01); *Y02T 10/16* (2013.01)

(58) Field of Classification Search
CPC .... F25B 2309/1403; F25B 9/00; F25B 9/145; Y02T 10/16
See application file for complete search history.

(56) References Cited

U.S. PATENT DOCUMENTS

| | | | |
|---|---|---|---|
| 8,938,963 B2 * | 1/2015 | Yamamoto | F02G 1/04 60/517 |
| 10,240,822 B2 * | 3/2019 | Ozaki | F25B 9/145 |
| 2008/0110180 A1 * | 5/2008 | Watanabe | F02F 3/003 62/6 |
| 2009/0000577 A1 * | 1/2009 | Miyagawa | F01M 5/001 123/41.2 |
| 2013/0312429 A1 * | 11/2013 | Greuet | F25B 9/14 62/6 |

FOREIGN PATENT DOCUMENTS

| | | | |
|---|---|---|---|
| JP | 2005233485 A | | 9/2005 |
| JP | 2006002599 A | | 1/2006 |
| JP | 2007155167 A | * | 6/2007 |
| JP | 2007237020 A | | 9/2007 |
| JP | 2007263541 A | | 10/2007 |
| JP | 2009184538 A | | 8/2009 |
| JP | 2009216044 A | | 9/2009 |
| JP | 2012154251 A | | 8/2012 |
| JP | 2015031240 A | | 2/2015 |

* cited by examiner

US 10,767,538 B2

ENERGY CONVERSION DEVICE

CROSS REFERENCE TO RELATED APPLICATION

The present application is a continuation application of International Patent Application No. PCT/JP2017/030224 filed on Aug. 24, 2017, which designated the United States and claims the benefit of priority from Japanese Patent Application No. 2016-198370 filed on Oct. 6, 2016. The entire disclosures of all of the above applications are incorporated herein by reference.

TECHNICAL FIELD

The present disclosure relates to an energy conversion device.

BACKGROUND ART

Conventionally, there is an energy conversion device that converts waste heat, for example, of an engine into acoustic energy by a thermoacoustic effect, converts the acoustic energy into other energy such as cold heat, and outputs the other energy.

SUMMARY

According to an aspect of the present disclosure, an energy conversion device includes: a pipe member including a working gas and a transmission path for an acoustic wave of the working gas. A first acoustic wave generator is disposed in the pipe member. The first acoustic wave generator includes a thermal energy generator configured to generate a first thermal energy from electric energy supplied from an electric power source. The first acoustic wave generator converts the first thermal energy generated by the thermal energy generator to an acoustic energy to generate the acoustic wave of the working gas by a self-excited thermo acoustic vibration. A second acoustic wave generator is disposed in the pipe member, and converts a second thermal energy supplied from a heat supply source to an acoustic energy to generate the acoustic wave of the working gas by a self-excited thermo acoustic vibration. An output unit is disposed in the pipe member, and converts an acoustic energy of the acoustic waves from the first acoustic wave generator and the second acoustic wave generator to other energy other than the acoustic energy and outputting the other energy.

DETAILED DESCRIPTION

Figure 1:
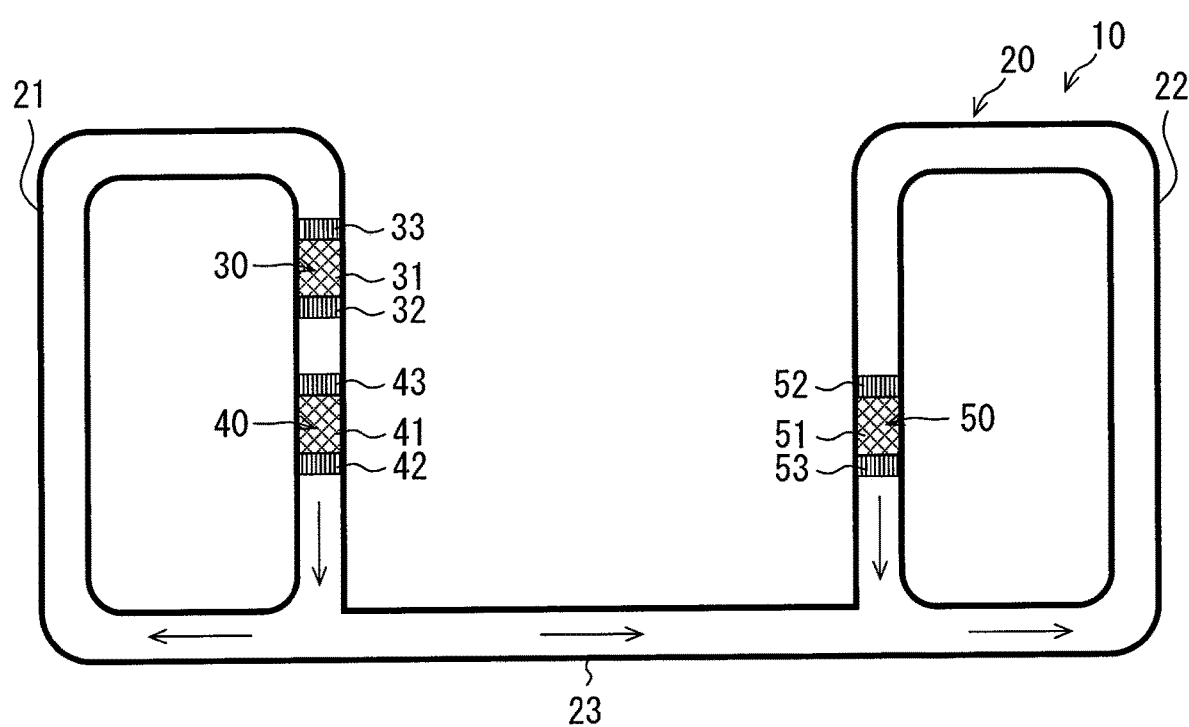
FIG. 1 is a schematic view illustrating a thermoacoustic device which is an energy conversion device according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment to which the disclosed technology is applied will be described with reference to FIGS. 1 to 7.

As shown in FIG. 1, a thermoacoustic device 10, which is an energy conversion device in the present embodiment, includes a pipe member 20, a first acoustic wave generator 30, a second acoustic wave generator 40, and a cooler 50. The pipe member 20 has a first loop tube 21 formed in a loop shape, a second loop tube 22 formed in a loop shape, and a connecting tube 23 that connects the first loop tube 21 and the second loop tube 22 with each other.

The pipe member 20 is made of, for example, a stainless steel, and is circular in the cross section. Working gas is enclosed inside the pipe member 20. The working gas may be, for example, an inert gas having a low molecular number alone or a combination thereof, such as nitrogen, argon, helium or the like. The working gas is filled in the pipe member 20, for example, at a pressure of about 0.1 to 3.0 MPa. The pipe member 20 forms a transmission path for transmission of acoustic wave of the working gas inside. The thermoacoustic device 10 is a so-called double loop thermoacoustic engine.

The first acoustic wave generator 30 and the second acoustic wave generator 40 are provided in the first loop tube 21. The first acoustic wave generator 30 and the second acoustic wave generator 40 are prime movers in the thermoacoustic device 10, and have function of generating acoustic waves by converting thermal energy into acoustic energy. The first acoustic wave generator 30 and the second acoustic wave generator 40 are arranged in series in the first loop tube 21. That is, the first acoustic wave generator 30 and the second acoustic wave generator 40 are arranged in series along the traveling direction of the acoustic wave in the transmission path.

The first acoustic wave generator 30 includes a stack 31 housed in the first loop tube 21, a heater 32 provided at one end of the stack 31 which becomes a high temperature end, and a low temperature side heat exchanger 33 provided at the other end of the stack 31 which becomes a low temperature end. The heater 32 is, for example, an electric heater, and heat energy is generated by the heater 32 from the electric energy supplied from the electric power source to heat the working gas. The heater 32 corresponds to a thermal energy generator, and the heat energy generated by the heater 32 corresponds to a first thermal energy. The low temperature side heat exchanger 33 cools the working gas by heat exchange with the heat transport medium.

The stack 31 includes plural metal meshes, for example, made of stainless steel and stacked with each other. Fine passages for the working gas are formed in the stack 31 to have minute intervals. The stack 31 may have, for example, a honeycomb structure made of ceramics or a sintered metal.

The second acoustic wave generator 40 includes a stack 41 housed in the first loop tube 21, a high temperature side heat exchanger 42 provided at one end of the stack 41 serving as a high temperature end, and a low temperature side heat exchanger 43 provided at the other end of the stack 41 serving as a low temperature end. The high temperature side heat exchanger 42 heats the working gas by heat exchange with the heat transport medium. The heat energy supplied from the heat supply source by the heat transport medium corresponds to a second thermal energy. The low temperature side heat exchanger 43 cools the working gas by heat exchange with the heat transport medium.

Similarly to the stack 31, the stack 41 includes plural metal meshes, for example, made of stainless steel and stacked with each other. Fine passages for the working gas are formed in the stack 41 to have minute intervals. The stack 41 may have, for example, a honeycomb structure made of ceramics or a sintered metal.

A temperature gradient is generated in the passage walls in the stack 31, 41 in the extending direction of the first loop tube 21 due to the functions of the heaters and heat exchangers disposed at both ends. When the working gas moves along the temperature gradient in the fine passage of the stack 31, 41 in which the temperature gradient has occurred, a self-excited pressure variation occurs in the working gas due to the thermoacoustic effect. That is, the stack 31, 41 generates acoustic waves in the working gas due to the self-excited thermoacoustic vibration. Acoustic waves are generated in the acoustic wave transmission path in the first loop tube 21, and include a traveling wave traveling in the arrow direction in FIG. 1 from the high temperature end of each of the acoustic wave generators 30, 40, and a standing wave.

A part of the acoustic wave in the first loop tube 21 is propagated into the second loop tube 22 via the connecting tube 23. The upstream end of the connecting tube 23 in the acoustic wave advancing direction is connected to the first loop tube 21, and the downstream end in the acoustic wave advancing direction is connected to the second loop tube 22. The first acoustic wave generator 30 and the second acoustic wave generator 40 are arranged relatively close to the connecting tube 23, in the first loop tube 21. The first acoustic wave generator 30 and the second acoustic wave generator 40 are arranged in this order from the upstream side, in the acoustic wave advancing direction, in the first loop tube 21, within an area upstream of the connected portion connected to the connecting tube 23. In other words, the first acoustic wave generator 30 is disposed upstream of the second acoustic wave generator 40 in the acoustic wave advancing direction. An level of an acoustic energy in the acoustic wave transmission path is higher at the downstream end of the second acoustic wave generator 40 than at the upstream end of the first acoustic wave generator 30.

The first acoustic wave generator 30 and the second acoustic wave generator 40 are arranged relatively close to each other in the extending direction of the first loop tube 21. The low temperature side heat exchanger 33, the stack 31, the heater 32, the low temperature side heat exchanger 43, the stack 41 and the high temperature side heat exchanger 42 are arranged in this order in the extending direction of the first loop tube 21. The opposing distance between the high temperature end of the stack 41 and the low temperature end of the stack 31 is larger than the opposing distance between the high temperature end of the stack 31 and the low temperature end of the stack 41 in the extending direction of the first loop tube 21. The stack 31 and the stack 41 are arranged such that the acoustic waves generated by the respective stacks do not interfere with each other so as not to weaken the acoustic energy.

The cooler 50 is provided in the second loop tube 22. The cooler 50 is a passive unit in the thermoacoustic device 10 and has a function of storing heat by converting acoustic energy into thermal energy. The cooler 50 corresponds to an output unit that converts the acoustic energy of the acoustic waves from the first acoustic wave generator 30 and the second acoustic wave generator 40 into thermal energy and outputs the thermal energy.

The cooler 50 includes a stack 51 housed in the second loop tube 22, a high temperature side heat exchanger 52 provided at one end of the stack 51 serving as a high temperature end, and a low temperature side heat exchanger 53 provided at the other end of the stack 51 serving as a low temperature end. The high temperature side heat exchanger 52 radiates the heat of the working gas to the heat transport medium by heat exchange. The low temperature side heat exchanger 53 causes the heat of the heat transport medium to be absorbed by the working gas by heat exchange.

Similarly to the stack 31, 41, the stack 51 includes plural metal meshes, for example, made of stainless steel and stacked with each other. Fine passages for the working gas are formed in the stack 51 to have minute intervals. The stack 51 may have, for example, a honeycomb structure made of ceramics or a sintered metal.

When acoustic waves propagate into the second loop tube 22 via the interior of the connecting tube 23 and enter the fine passage in the stack 51 from the high temperature end, the conversion from acoustic energy to thermal energy and the conversion from thermal energy to acoustic energy are repeated between the working gas and the wall of the passage. In the process, heat transport is performed from the low temperature end to the high temperature end of the stack 51. The cooler 50 is a heat pump that transports the heat from the low temperature end to the high temperature end of the stack 51 by using acoustic energy.

The cooler 50 is disposed relatively close to the connecting tube 23 in the second loop tube 22. The cooler 50 is disposed upstream of the connected portion connected with the connecting tube 23 in the acoustic wave advancing direction in the second loop tube 22. The high temperature side heat exchanger 52, the stack 51, and the low temperature side heat exchanger 53 of the cooler 50 are arranged in this order in the extending direction of the second loop tube 22.

The cooler 50 converts the acoustic energy into thermal energy, which is an energy other than the acoustic energy, and outputs the thermal energy. The cooler 50 outputs thermal energy as cold heat from the low temperature side heat exchanger 53 provided at the low temperature end of the stack 51.

Figure 2:
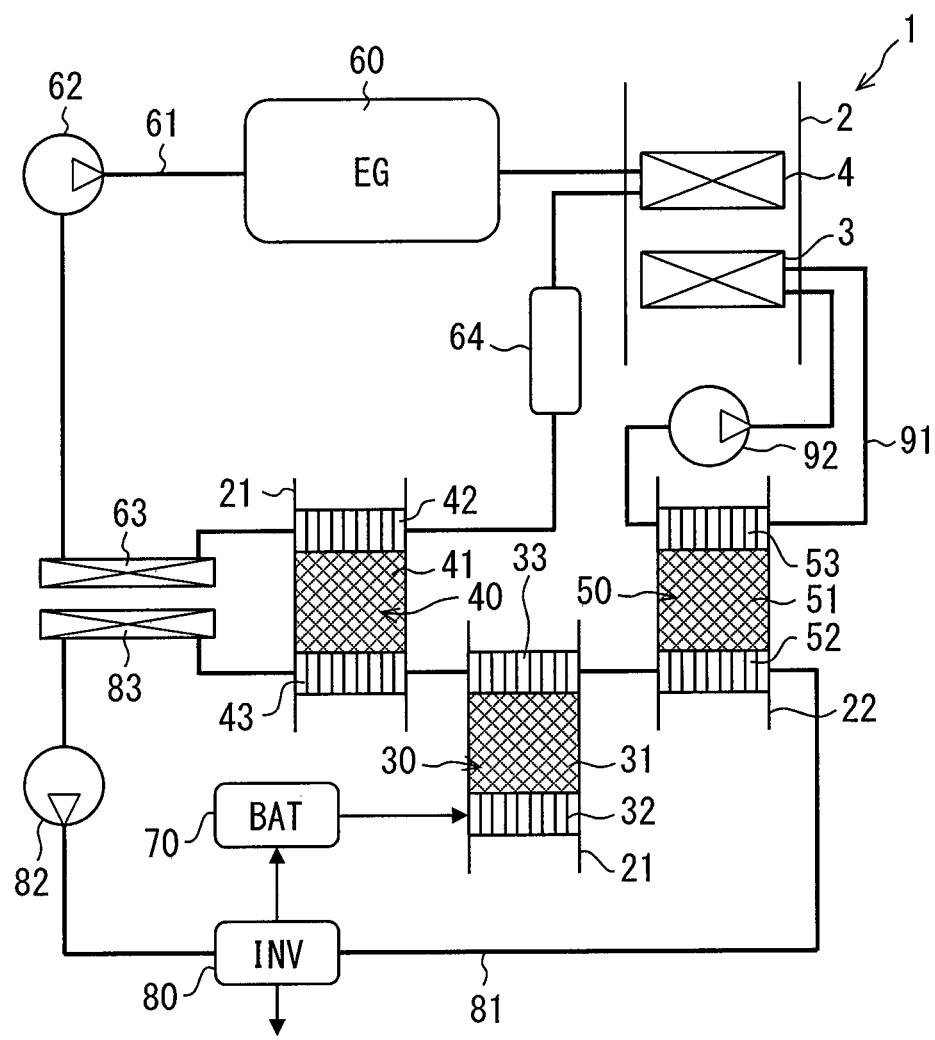
FIG. 2 is a schematic diagram illustrating an air conditioner using the thermoacoustic device of the first embodiment.

The thermoacoustic device 10 which is an energy conversion device of the present embodiment is suitably applied to, for example, an air conditioner for a vehicle. As shown in FIG. 2, an air conditioner 1 includes an air conditioning case 2, a cooler core 3, and a heater core 4. The air conditioning case 2 internally forms an air passage for air to be blown into the vehicle cabin. The cooler core 3 and the heater core 4 are disposed in the air conditioning case 2. The cooler core 3 absorbs heat from the air circulating in the air conditioning case 2 to cool the air. Then, the air is appropriately heated by the heat radiation from the heater core 4 to adjust the temperature of the air for conditioning air in the vehicle cabin. The air conditioner 1 conditions the air in the vehicle cabin.

The engine 60 which is an internal combustion engine mounted on a vehicle is provided with a circulation circuit 61 and a circulation pump 62. The circulation circuit 61 is capable of circulating the engine cooling water to the heater core 4 and the high temperature radiator 63. The circulation pump 62 circulates the engine cooling water in the circulation circuit 61. An exhaust heat recovery unit 64 is provided downstream of the heater core 4 in the flow of cooling water, in the circulation circuit 61. The exhaust heat recovery unit 64 heats the engine cooling water with the heat of the exhaust gas of the engine 60 to recover the heat exhausted from the engine. The high temperature side heat exchanger 42 of the second acoustic wave generator 40 is provided between the exhaust heat recovery unit 64 and the high temperature radiator 63 of the circulation circuit 61. The working gas is heated in the high temperature side heat exchanger 42 by heat exchange with the engine cooling water as a heat transport medium flowing out of the exhaust heat recovery unit 64 and guided to the high temperature radiator 63. The engine 60 corresponds to a heat supply source in the present embodiment.

Further, the exhaust heat recovery unit 64 corresponds to an exhaust heat recovery part in the present embodiment.

FIG. 2 illustrates only the circulation path through which the engine cooling water is circulated in the order of the heater core 4, the exhaust heat recovery unit 64, the high temperature side heat exchanger 42, and the high temperature radiator 63, but is not limited thereto. The circulation circuit 61 may have a bypass flow path that bypasses the engine 60 for the cooling water when the engine 60 is not sufficiently warmed up. Further, a bypass flow passage may be provided to bypass the high temperature radiator 63 for the engine cooling water.

A power storage device 70 and an inverter device 80 are mounted on the vehicle. The power storage device 70 can charge and discharge, for example, to a motor generator for driving the vehicle. The power storage device 70 can also be charged, for example, from an external electric power source out of the vehicle or discharged to the outside of the vehicle. When the power storage device 70 is charged or discharged, AC/DC conversion is performed by the inverter device 80 as a power conversion device. The power storage device 70 is also capable of supplying power to the heater 32 of the first acoustic wave generator 30. The power storage device 70 corresponds to an electric power source according to the present embodiment.

The inverter device 80 emits heat by the switching operation of the switching element at the time of power conversion. The inverter device 80 is provided with a circulation circuit 81 and a circulation pump 82. The circulation circuit 81 is capable of circulating inverter cooling water for cooling the inverter device 80 to the low temperature radiator 83. The circulation pump 82 circulates the inverter cooling water in the circulation circuit 81. The high temperature side heat exchanger 52 of the cooler 50, the low temperature side heat exchanger 33 of the first acoustic wave generator 30, and the low temperature side heat exchanger 43 of the second acoustic wave generator 40 are provided between the inverter device 80 and the low temperature radiator 83 of the circulation circuit 81. Heat is exchanged between the working gas and the inverter cooling water in the high temperature side heat exchanger 52, the low temperature side heat exchanger 33, and the low temperature side heat exchanger 43. The inverter cooling water corresponds to the heat transport medium flowing out of the inverter device 80 and guided to the low temperature radiator 83. The inverter cooling water is a liquid phase cooling medium that cools the power conversion device. The circulation circuit 81 is a cooling medium circuit that can discard waste heat of the power conversion device outside the circuit.

A circulation circuit 91 is connected to the low temperature side heat exchanger 53 of the cooler 50, for circulating the heat transport medium cooled by heat exchange with the working gas to the cooler core 3. The circulation circuit 91 is provided with a circulation pump 92 circulating the heat transport medium in the circulation circuit 91. The cold heat output from the low temperature side heat exchanger 53 is transported to the cooler core 3 by the heat transport medium, and the air to be blown into the vehicle cabin is cooled in the cooler core 3.

Figure 3:
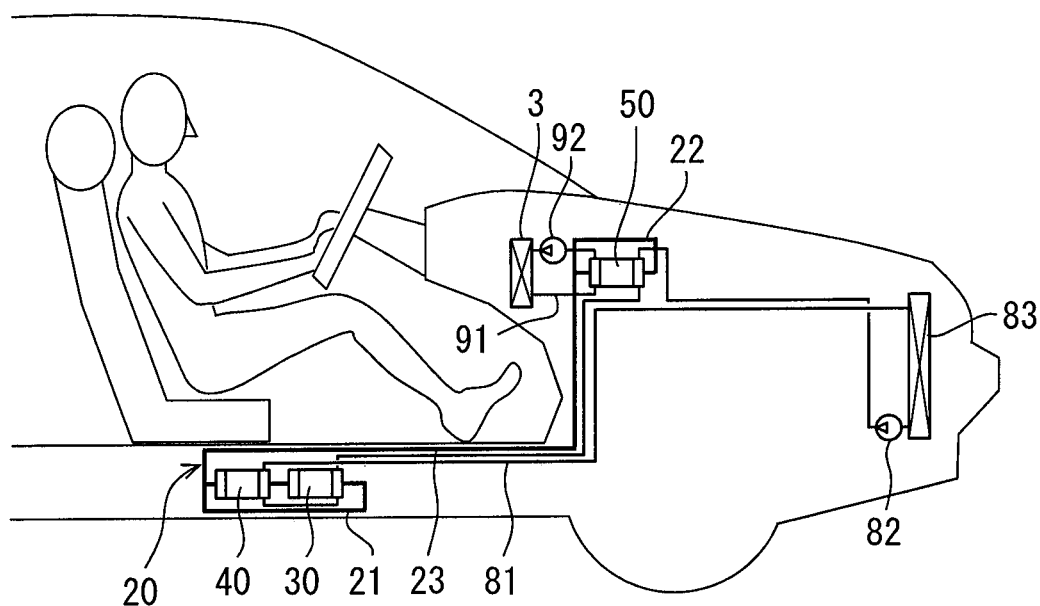
FIG. 3 is a view illustrating an example of the thermoacoustic device of the first embodiment mounted on a vehicle.

The air conditioner 1 using the thermoacoustic device 10 is mounted on a vehicle as shown in FIG. 3. The low temperature radiator 83 is disposed together with the high temperature radiator at a front portion of the engine compartment. The first acoustic wave generator 30 and the second acoustic wave generator 40 are disposed under the floor of the vehicle cabin. The cooler 50 is disposed in the rear portion of the engine compartment, and is located relatively close to the cooler core 3 disposed in the front portion of the cabin.

The pipe member 20 and the circulation circuit 81 are extended, for example, along a common piping space. Accordingly, it is easy to secure the installation space of the pipe member 20, the circulation circuit 81, and the like. Further, the cooler 50 and the cooler core 3 are disposed relatively close to each other with a partition wall therebetween. As a result, the circulation circuit 91 can be relatively made short.

Figure 4:
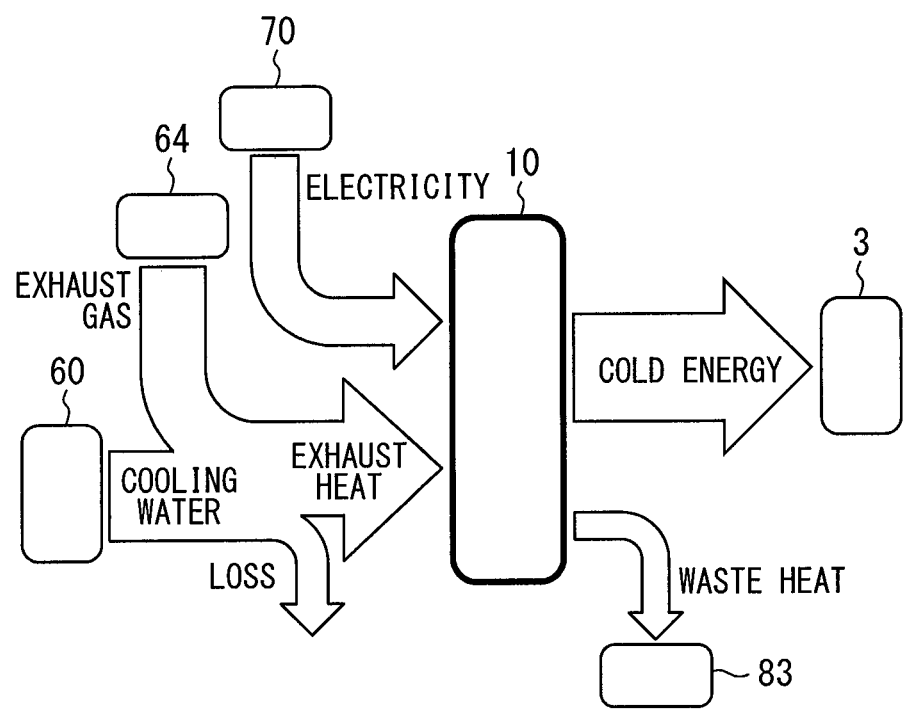
FIG. 4 is a diagram illustrating input and output of energy relative to the thermoacoustic device of the first embodiment.

As shown in FIG. 4, electric energy is supplied to the thermoacoustic device 10 from the power storage device 70 serving as an electric power source. Exhaust heat is supplied from the engine 60 to the thermoacoustic device 10 as thermal energy by engine cooling water that cools the engine 60. Exhaust heat recovered by the exhaust heat recovery unit 64 through the engine cooling water is also supplied to the thermoacoustic device 10. A part of the thermal energy supplied by the engine cooling water is lost due to heat radiation or the like.

In the thermoacoustic device 10, the thermal energy generated from the electrical energy supplied from the power storage device 70 and the thermal energy supplied from the engine 60 and the exhaust heat recovery unit 64 are once converted into acoustic energy and propagated. The propagated acoustic energy is converted into cold energy as thermal energy by conversion again and is output to the cooler core 3. The heat energy that would be discarded at the time of each energy conversion is discarded to outside air from the low temperature radiator 83.

According to the thermoacoustic device 10 of the present embodiment, the following effects can be obtained.

The thermoacoustic device 10 includes the pipe member 20, the first acoustic wave generator 30, the second acoustic wave generator 40, and the cooler 50 which is an output unit. Working gas is enclosed in the pipe member 20 to form a transmission path for an acoustic wave of the working gas. The first acoustic wave generator 30 is provided in the pipe member 20. The first acoustic wave generator 30 includes the heater 32 which is a thermal energy generator that generates a first thermal energy from the electric energy supplied from the power storage device 70 which is an electric power source. The first acoustic wave generator 30 converts the first thermal energy generated by the thermal energy generator into acoustic energy and generates an acoustic wave by self-excited thermal acoustic vibration in the working gas. The second acoustic wave generator 40 is provided in the pipe member 20. The second acoustic wave generator 40 converts the second thermal energy supplied from the engine 60 as a heat supply source into acoustic energy and generates an acoustic wave by self-excited thermal acoustic vibration in the working gas. The cooler 50, which is an output unit, is provided in the pipe member 20. The acoustic energy of the acoustic waves from the first acoustic wave generator 30 and the acoustic wave from the second acoustic wave generator 40 are converted into cold energy which is energy other than acoustic energy, and the cold energy is output.

Accordingly, the thermoacoustic device 10 includes the first acoustic wave generator 30, the second acoustic wave generator 40, and the cooler 50. The first acoustic wave generator 30 generates the first thermal energy from the electric energy supplied from the power storage device 70 by the heater 32, and converts the first thermal energy into acoustic energy. The second acoustic wave generator 40 converts the second thermal energy supplied from the engine 60 into acoustic energy. The cooler 50 corresponding to an output unit can convert the acoustic energy of the acoustic waves from both the first acoustic wave generator 30 and the second acoustic wave generator 40 into cold energy, and can output the cold energy.

In a conventional energy conversion device, when the thermal energy supplied from the engine as the heat supply source is insufficient, a sufficiently stable output may not be obtained.

The technology disclosed herein is made in view of the above points, to provide an energy conversion device capable of obtaining a stable output even when thermal energy supplied from a heat supply source is insufficient.

Accordingly, the disclosed energy conversion device includes the first acoustic wave generator, the second acoustic wave generator and the output unit. The first acoustic wave generator generates first thermal energy from the electric energy supplied from the electric power source by the thermal energy generator and converts the first thermal energy into acoustic energy. The second acoustic wave generator converts the second thermal energy supplied from the heat supply source into acoustic energy. The output unit can convert the acoustic energy of the acoustic waves from both the first acoustic wave generator and the second acoustic wave generator into other energy and output the other energy.

Therefore, when the second thermal energy supplied from the heat supply source is not sufficient, the insufficient amount of thermal energy can be obtained from the first thermal energy generated from the electric energy by the thermal energy generator. As a result, the first and second acoustic wave generators convert the first and second thermal energy into acoustic energy, and the output unit converts the acoustic energy of acoustic waves from both the first acoustic wave generator and the second acoustic wave generator to the other energy. In this way, even when the thermal energy supplied from the heat supply source is insufficient, a stable output can be obtained.

Therefore, when the second thermal energy supplied from the engine 60 is not sufficient, the insufficient amount of thermal energy can be covered by the first thermal energy generated from the electric energy by the heater 32. As a result, the first and second acoustic wave generators 30 and 40 convert the first and second thermal energy into acoustic energy, and the acoustic energy of the acoustic waves from both the first acoustic wave generator 30 and the second acoustic wave generator 40 can be converted into cold energy by the cooler 50. In this way, even when the thermal energy supplied from the engine 60 as the heat supply source is insufficient, a stable output can be obtained.

The first acoustic wave generator 30 and the second acoustic wave generator 40 are arranged in series along the traveling direction of acoustic wave in the acoustic wave transmission path of the pipe member 20. The first acoustic wave generator 30 is disposed on the upstream side of the second acoustic wave generator 40 in the acoustic wave advancing direction. A level of the acoustic energy in the acoustic wave transmission path is higher at the downstream end of the second acoustic wave generator 40 than at the upstream end of the first acoustic wave generator 30. Accordingly, the operation efficiency can be reliably improved. The mutual positional relationship between the first acoustic wave generator 30 and the second acoustic wave generator 40 is found by the present inventors as a result of intensive investigation. The mutual positional relationship is also supported by theoretical calculation in the ideal state.

Figure 5:
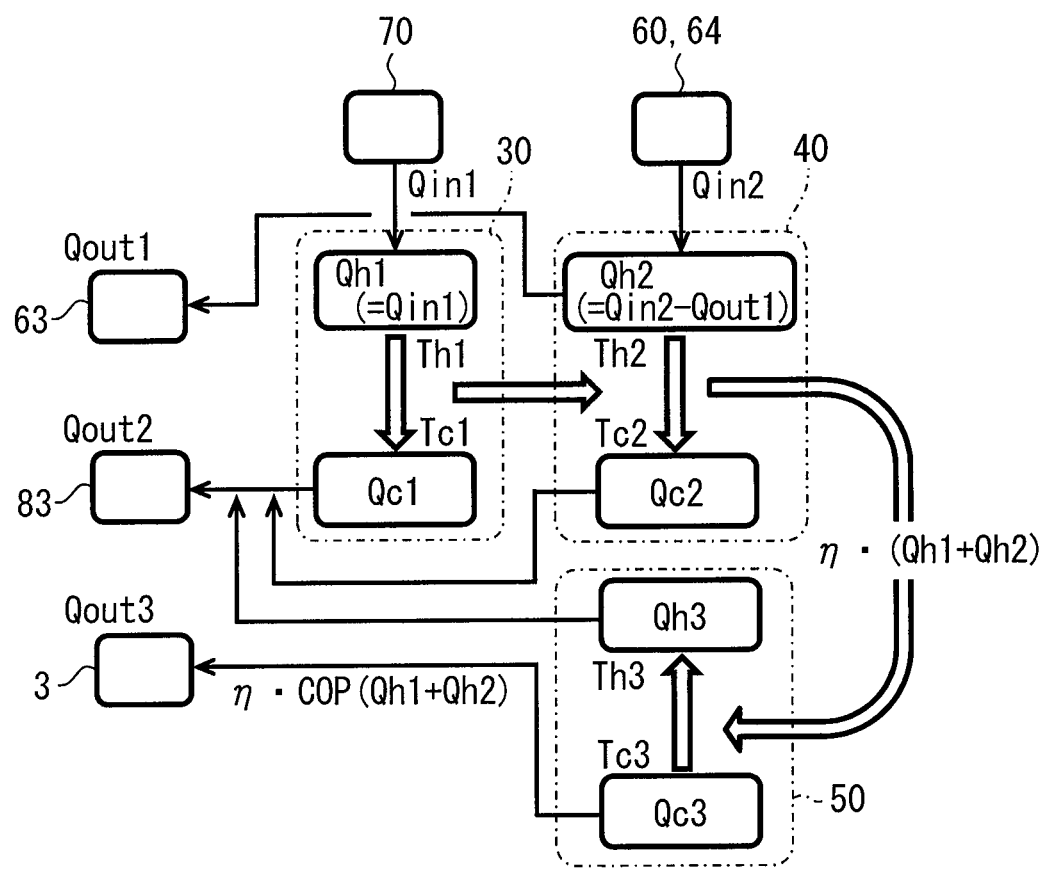
FIG. 5 is a diagram illustrating energy transport in the air conditioner of the first embodiment.

FIG. 5 illustrates the relationship of temperature and energy transfer in each part of the thermoacoustic device 10. As shown in FIG. 5, when the thermal energy Qin1 generated by the electric energy from the power storage device 70 is provided to the high temperature end, the high temperature end of the first acoustic wave generator 30 has the high temperature end heat flow value Qh1 which is a value of a heat flow at the high temperature end of the first acoustic wave generator 30. When the thermal energy Qin2 from the engine 60 including waste heat recovery is provided to the high temperature end, the high temperature end of the second acoustic wave generator 40 has the high temperature end heat flow value Qh2 which is a value of a heat flow at the high temperature end of the second acoustic wave generator 40. The high temperature end heat flow value Qh2 is a value obtained by subtracting the thermal energy Qout1, which is discarded to the outside air from the high temperature radiator 63, from the value Qin2.

In the first acoustic wave generator 30 and the second acoustic wave generator 40, the thermal energy is converted into acoustic energy by the thermoacoustic effect, and the acoustic energy of $\eta(Qh1+Qh2)$ is propagated to the cooler 50. Here, $\eta$ is the Carnot efficiency, which is the upper limit of the efficiency in the ideal state. In the cooler 50, the acoustic energy is converted into cold energy, and the cold energy Qout3 expressed by $\eta \cdot COP(Qh1+Qh2)$ is output to the cooler core 3. COP is the efficiency in the ideal state of the energy conversion of the cooler 50 which is an output unit.

The heat energy Qout2 is discarded to the outside air from the low temperature radiator 83. The heat energy Qout2 is the sum of the low temperature end heat flow value Qc1 of the stack 31, the low temperature end heat flow value Qc2 of the stack 41, and the high temperature end heat flow value Qh3 of the stack 51. The heat flow value Q and the temperature T of each part shown in FIG. 5 correspond to those shown in FIG. 6 to be described later.

Figure 6:
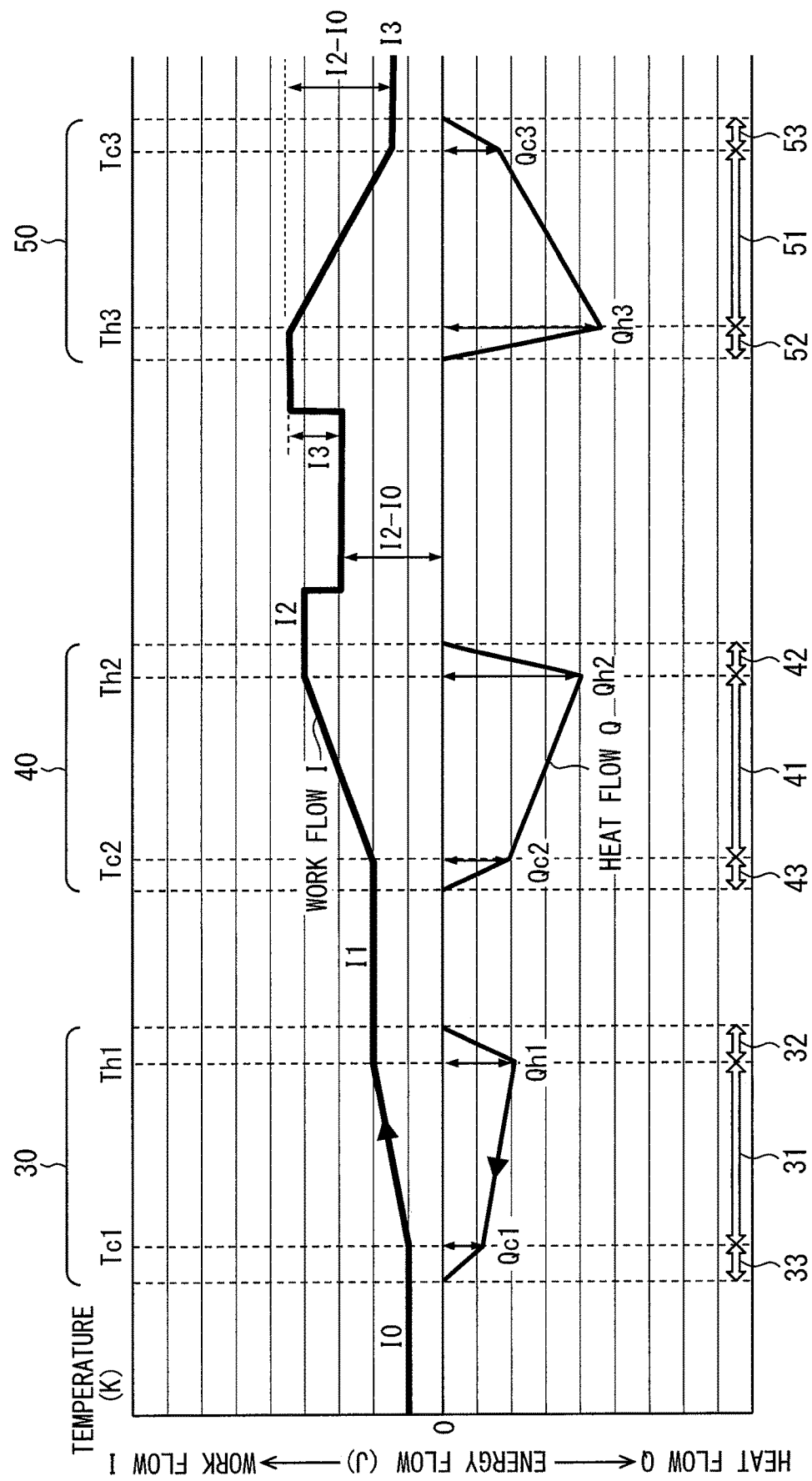
FIG. 6 is a graph illustrating an energy flow distribution in the thermoacoustic device of the first embodiment.

FIG. 6 is a graph illustrating an energy flow distribution of the thermoacoustic device 10. The horizontal axis of the graph indicates the position in the extending direction of the pipe member 20. The vertical axis represents the energy flow, where the work flow I is shown in the area upper than 0 and the heat flow Q is shown in the area lower than 0.

As is apparent from FIG. 6, when there is no loss in the energy propagation or the like, the following equations (1) to (5) hold between the work flow I and the heat flow Q for each part.

$$I0 = Qc1 \tag{1}$$

$$I1 = Qh1 = Qc2 \tag{2}$$

$$I = Qh2 \tag{3}$$

$$I3 + (I2 - I0) = Qh3 \tag{4}$$

$$I3 = Qc3 \tag{5}$$

Further, when it is assumed that the working gas isentropically changes, the following equations (6) to (8) hold between the heat flow value Q and the end temperature T at each end portion of the stack 31, 41.

$$Qc1/Tc1 = Qh1/Th1 \tag{6}$$

$$Qc2/Tc2 = Qh2/Th2 \tag{7}$$

$$Qh3/Th3 = Qc3/Tc3 \tag{8}$$

The efficiency η·COP of the thermoacoustic device 10 is generally expressed by the following equation (9).

$$\eta \cdot COP = Qc3/(Qh1 + Qh2) \tag{9}$$

However, since the thermal energy obtained from the engine 60 is to be discarded unless it is used, the substantial efficiency η·COP of the thermoacoustic device 10 is given by the following equation (10). The substantial efficiency obtained by excluding the thermal energy to be discarded from the calculated efficiency is the operation efficiency of the thermoacoustic device 10 in the present specification. The operation efficiency η·COP of the thermoacoustic device 10 can also be said to be a substantial efficiency not considering the amount of thermal energy to be discarded if not utilized.

$$\eta \cdot COP = Qc3/Qh1 \tag{10}$$

When the above equation (10) is transformed using the relationships of the equations (1) to (8), the operation efficiency η·COP of the thermoacoustic device 10 is expressed by the following equation (11).

[Equation 1]

$$\eta \cdot COP = \left[\frac{Tc3}{Th3 - Tc3}\right] \cdot \left[1 - \frac{Tc1}{Th1} \cdot \frac{Tc2}{Th2}\right] \cdot \frac{Th2}{Tc2} \tag{11}$$

In a comparative example 1 in which the mutual positional relationship between the acoustic wave generator using the electric energy and the acoustic wave generator using the engine waste heat is reversed from the embodiment, the efficiency expressed by the equation (9) is changed into the following equation (12).

$$\eta \cdot COP = Qc3/Qh2 \tag{12}$$

When the formula (12) is transformed using the relationships of the formulas (1) to (8), the operation efficiency η·COP of the comparative example is expressed by the following formula (13).

[Equation 2]

$$\eta \cdot COP = \left[\frac{Tc3}{Th3 - Tc3}\right] \cdot \left[1 - \frac{Tc1}{Th1} \cdot \frac{Tc2}{Th2}\right] \tag{13}$$

As is apparent from the comparison between the equation (11) and the equation (13), the operation efficiency of the thermoacoustic device 10 of the present embodiment is obtained by multiplying the operation efficiency of the comparative example 1 by the factor of Th2/Tc2. Since the high temperature end temperature Th2 of the stack 41 is necessarily higher than the low temperature end temperature Tc2, the factor Th2/Tc2 is always larger than 1. Therefore, the operation efficiency of the thermoacoustic device 10 of the present embodiment represented by the formula (11) is certainly higher than the operation efficiency of the comparative example 1 represented by the formula (13).

As described above, the mutual positional relationship between the first acoustic wave generator 30 and the second acoustic wave generator 40 found by the present inventors is also supported by theoretical calculation.

In the present embodiment, it is possible to achieve high output and high operation efficiency by adopting plural prime movers, i.e., the first acoustic wave generator 30 for inputting electric energy and the second acoustic wave generator 40 for inputting engine waste heat energy. In case where a single prime mover is used, in contrast to the present embodiment using the plural prime movers, the output is low or the operation efficiency is low.

Figure 7:
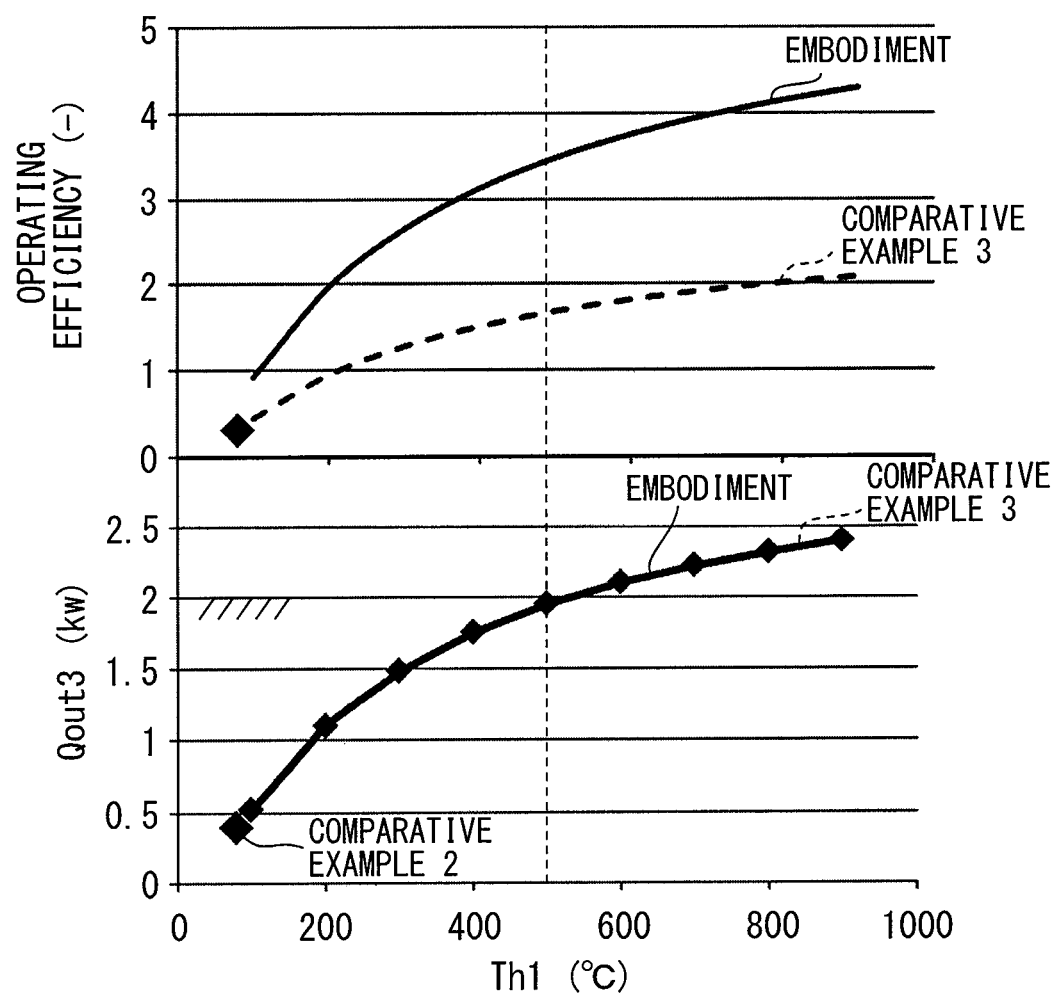
FIG. 7 is a graph illustrating a cold heat output characteristics and an operation efficiency characteristics of the thermoacoustic device of the first embodiment.

As shown in the lower part of FIG. 7, according to the thermoacoustic device 10, when the high temperature end temperature Th1 of the stack 31 is set to 500° C. or higher, it is possible to secure 2.0 kW which is necessary for general cooling as the cold heat output Qout3. The high temperature end temperature Th2 of the stack 41, at this time, is 80° C. In a comparative example 2 in which the acoustic wave is generated only by the exhaust heat energy of the engine 60 without adopting the acoustic wave generator using the electric energy, it is difficult to obtain the required cold heat output. In a comparative example 3 in which acoustic waves are generated only by electrical energy, as shown in the upper part of FIG. 7, the operation efficiency is low because the engine exhaust heat cannot be used, although it is possible to secure the necessary cold heat output by increasing the high temperature end temperature. In contrast, according to the present embodiment in which the plural prime movers are used, it is possible to increase the cold heat output and to raise the operation efficiency. The input value Qin1 of the first thermal energy generated from the electrical energy, at this time, is 0.56 kW and the input value Qin2 of the second thermal energy is 1.26 kW.

In the present embodiment, the first heating temperature Th1, which is a heating temperature of the working gas by the first thermal energy in the first acoustic wave generator 30, is higher than the second heating temperature Th2, which is a heating temperature of the working gas by the second thermal energy in the second acoustic wave generator 40. The first heating temperature Th1 is the high temperature end temperature of the stack 31. The second heating temperature Th2 is the high temperature end temperature of the stack 41. Accordingly, it is easy to adjust and relatively raise the temperature of the first heating temperature Th1 obtained by utilizing the electric energy from the electric power source than the second heating temperature Th2 where the upper limit temperature depends on the state of the heat supply source. Therefore, it is easy to improve the operation efficiency.

Further, there is provided the exhaust heat recovery unit 64 as an exhaust heat recovery part that recovers the heat of the exhaust gas exhausted from the engine 60, which is a heat supply source, with a cooling liquid medium that cools the heat supply source. The second acoustic wave generator 40 is configured to input the heat acquired with the cooling of the heat supply source and the heat recovered by the exhaust heat recovery unit as the second thermal energy by the cooling medium. Accordingly, it is easy to form a flow path of the cooling heat medium connecting the heat supply source and the second acoustic wave generator 40. Moreover, it is relatively easy for the second acoustic wave generator 40 to obtain thermal energy from the heat supply source by heat transport by the cooling medium. Further, when the heat supply source is an internal combustion engine or the like as in the present embodiment, it is also possible to utilize the thermal energy of exhaust gas, which has relatively high temperature. Therefore, the thermal energy transported by the cooling liquid medium and the exhaust gas from the heat supply source can be utilized extremely effectively.

Further, there is provided the inverter device 80 and the circulation circuit 81. The inverter device 80 is a power conversion device for converting power for input to and output from the power storage device 70 serving as an electric power source. The circulation circuit 81 circulates a liquid phase cooling medium for cooling the power conversion device, and the heat exhausted from the power conversion devices can be discarded outside by the circulation circuit 81. Then, the first acoustic wave generator 30 and the second acoustic wave generator 40 are configured to discharge the amount Qc1, Qc2 of waste heat that is not converted to the acoustic energy, while being emitted from the working gas, to the cooling medium circulating through the circulation circuit 81. According to this structure, it is easy to form the cooling medium circuit to extend to the acoustic wave generator 30, 40, and the waste heat not converted to the acoustic energy in the acoustic wave generator 30, 40 can be easily discharged to the cooling medium of the power conversion device.

Second Embodiment

A second embodiment will be described with reference to FIGS. 8 and 9.

The second embodiment is different from the first embodiment in the configuration of the pipe member. The same reference numerals are given to the same parts as those of the first embodiment, and the description thereof will be omitted. Components denoted by the same reference numerals as in the first embodiment, and other configurations not described in the second embodiment are the same as in the first embodiment, and the same operation and effect are obtained.

Figure 8:
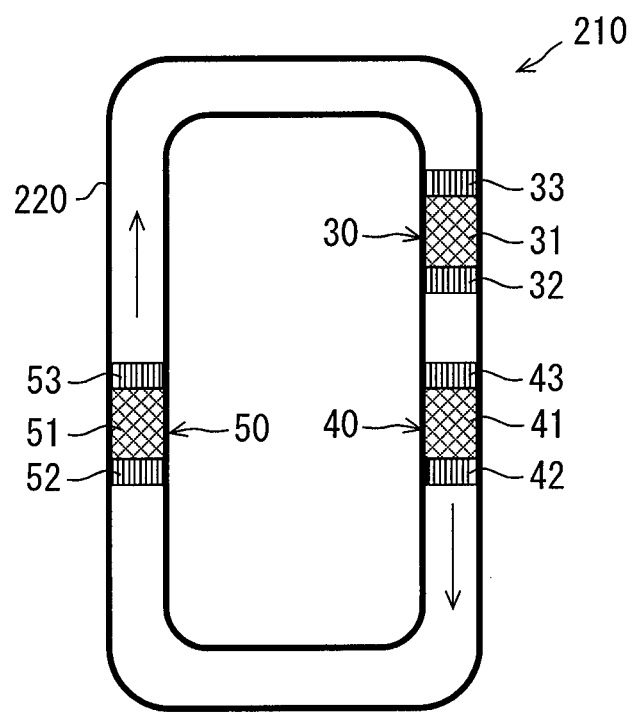
FIG. 8 is a schematic view illustrating a thermoacoustic device according to a second embodiment.

As shown in FIG. 8, the thermoacoustic device 210 of the present embodiment has the pipe member 220 formed in a loop shape. The pipe member 220 is made of, for example, stainless steel, and is circular in the cross section. Working gas is enclosed inside the pipe member 220 as in the first embodiment. The first acoustic wave generator 30, the second acoustic wave generator 40, and the cooler 50 are provided in the pipe member 220. The thermoacoustic device 210 of the present embodiment is a so-called single loop thermoacoustic engine.

The first acoustic wave generator 30 and the second acoustic wave generator 40 are arranged in this order from the upstream side in the acoustic wave advancing direction in the pipe member 220. In other words, the first acoustic wave generator 30 is disposed on the upstream side of the second acoustic wave generator 40 in the acoustic wave advancing direction, and a level of the acoustic energy in the acoustic wave transmission path is higher at the downstream end of the second acoustic wave generator 40 than at the upstream end of the first acoustic wave generator 30.

The first acoustic wave generator 30 and the second acoustic wave generator 40 are arranged relatively close to each other in the extending direction of the pipe member 220. The low temperature side heat exchanger 33, the stack 31, the heater 32, the low temperature side heat exchanger 43, the stack 41, and the high temperature side heat exchanger 42 are arranged in this order in the extending direction of the pipe member 220. The opposing distance between the high temperature end of the stack 41 and the low temperature end of the stack 31 is larger than the opposing distance between the high temperature end of the stack 31 and the low temperature end of the stack 41 in the extending direction of the pipe member 220. The positional relationship between the stack 31 and the stack 41 is set such that the acoustic waves generated by the respective stacks do not interfere with each other so as not to weaken the acoustic energy. The cooler 50 as an output unit is disposed in a space where the high temperature end of the stack 41 and the low temperature end of the stack 31 oppose to each other in the acoustic wave transmission path in the pipe member 220.

Also in the thermoacoustic device 210 of this embodiment, the same effect as in the first embodiment can be obtained.

Figure 9:
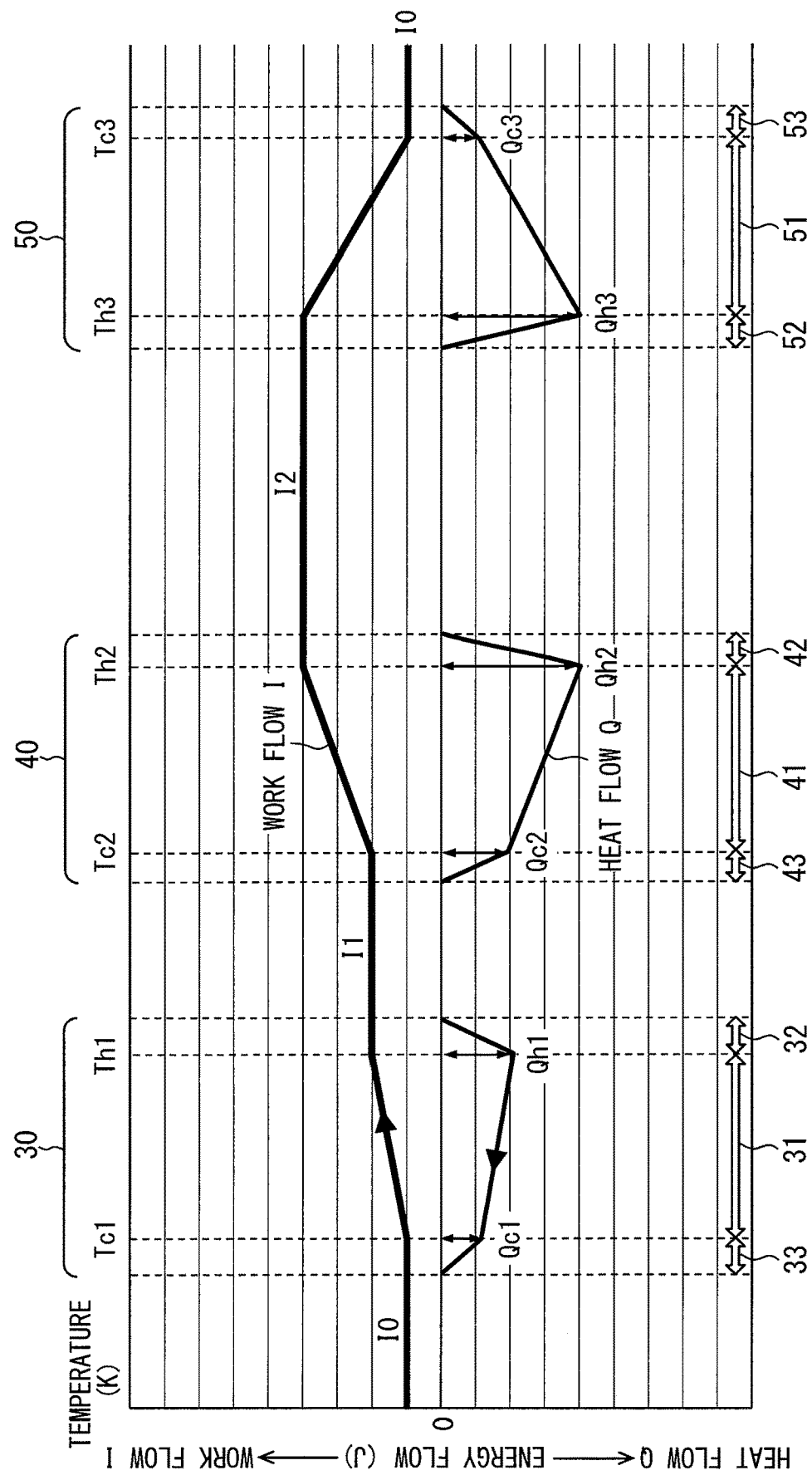
FIG. 9 is a graph illustrating an energy flow distribution in the thermoacoustic device of the second embodiment.

FIG. 9 is a graph illustrating the energy flow distribution of the thermoacoustic device 210. The horizontal axis of the graph indicates the position in the extending direction of the pipe member 220. The vertical axis indicates the energy flow, where the work flow I is shown in the area upper than 0 and the heat flow Q is shown in the area lower than 0.

As is apparent from FIG. 9, when there is no loss in energy propagation or the like, the following equations (14) to (17) hold between the work flow I and the heat flow Q.

$$I0=Qc1 \tag{14}$$

$$I1=Qh1=Qc2 \tag{15}$$

$$I2=Qh2=Qh3 \tag{16}$$

$$I0=Qc3 \tag{17}$$

When the working gas changes isentropically, the above-mentioned equations (6) to (8) hold between the heat flow value Q and the end temperature T at each end portion of the stack 31, 41, 51.

When the equation (10) is transformed using the relationships of the equations (6) to (8) and (14) to (17), the operation efficiency η·COP of the thermoacoustic device 210 is expressed by the following equation (18).

$$\eta \cdot COP = (Tc3/Th3) \cdot (Th2/Tc2) \tag{18}$$

When the equation (12) is transformed using the relationships of the equations (6) to (8) and (14) to (17), an operation efficiency η·COP of a comparative example, where the mutual positional relationship of the two acoustic wave generators is reversed from the embodiment, is expressed by the following equation (19).

$$\eta \cdot COP = Tc3/Th3 \quad (19)$$

As is apparent from the comparison between the equation (18) and the equation (19), the operation efficiency of the thermoacoustic device 210 of the present embodiment is obtained by multiplying the operation efficiency of the comparative example with the factor Th2/Tc2, similarly to the first embodiment. The factor Th2/Tc2 is always greater than 1. Therefore, the operation efficiency of the thermoacoustic device 210 of the present embodiment represented by the equation (18) is certainly higher than the operation efficiency of the comparative example represented by the equation (19).

Other Embodiments

The technology disclosed in this specification can be implemented with various modifications without being limited to the embodiments for implementing the disclosed technology. The disclosed technology is not limited to the combinations shown in the embodiments but can be implemented in various combinations. The above-described embodiment may further include any additional elements or features. Individual elements or features of a particular embodiment may be omitted. Individual elements or features of a particular embodiment are generally not limited to that particular embodiment, but, where applicable, are interchangeable and can be used in a selected embodiment, even if not specifically shown or described. It should be understood that individual structures, operations, and effects in a particular embodiment are merely examples. The technical scope of the disclosed technology is not limited to the description of the embodiment. Several technical ranges of the disclosed technology are indicated by the description of the claims and should be understood to include all modifications within the meaning and scope equivalent to the description of the claims.

In the above-described embodiment, the second acoustic wave generator 40 inputs the heat acquired by cooling the engine 60, which is the heat supply source of the engine cooling water, and the heat recovered by the exhaust heat recovery unit 64, which is the exhaust heat recovery part, as thermal energy, but is not limited thereto. For example, either one of the thermal energy obtained by cooling the engine or the thermal energy recovered from the engine exhaust heat may be input.

That is, the second acoustic wave generator 40 may be configured to input the second thermal energy transported by the engine cooling water which is a cooling medium for cooling the engine 60 which is a heat supply source. According to this, it is easy to form a flow path for the cooling heat medium to connect the heat supply source and the second acoustic wave generator 40, and it is easy for the second acoustic wave generator 40 to obtain thermal energy from the heat supply source by heat transport by the cooling medium.

Further, the second acoustic wave generator 40 may be configured to input the second thermal energy transported by the exhaust gas exhausted from the heat supply source. According to this, when the heat supply source is an internal combustion engine or the like, the exhaust gas has a relatively high temperature, and a relatively large temperature gradient can be produced in the second acoustic wave generator 40. Therefore, it is easy to improve the operation efficiency.

Further, in the above embodiment, the heat supply source is the engine 60, but is not limited to this. For example, the heat supply source may be another heat generating device that generates heat during operation. For example, the heat supply source may be natural energy such as geothermal.

Further, in the above embodiment, the electric power source is the power storage device 70, but the electric power source is not limited thereto. For example, electric energy supplied from an electric power source may be system power supplied from a power company, which is an example of an electric power source.

Further, in the above embodiment, the inverter device 80 is provided as the power conversion device, but is not limited thereto. For example, the power conversion device may be a converter device.

Further, in the above embodiment, the thermal energy unconverted to the acoustic energy while being emitted in the first acoustic wave generator 30 and the second acoustic wave generator 40 is discharged to the inverter cooling water, but is not limited to this. For example, the thermal energy unconverted to the acoustic energy may be released to another cooling medium. Further, for example, the thermal energy not converted to the acoustic energy may be directly released to outside air.

In the above embodiment, the first acoustic wave generator 30 and the second acoustic wave generator 40 are arranged in series along the acoustic wave traveling direction in the acoustic wave transmission path of the pipe member 20, 220. The first acoustic wave generator 30 is disposed on the upstream side of the second acoustic wave generator 40 in the acoustic wave advancing direction. The acoustic energy level of the acoustic wave transmission path is higher at the downstream end of the second acoustic wave generator 40 than at the upstream end of the first acoustic wave generator 30. However, it is not limited to this. For example, the second acoustic wave generator may be arranged on the upstream side of the first acoustic wave generator in the acoustic wave advancing direction. Further, for example, the first acoustic wave generator and the second acoustic wave generator may be arranged in parallel in the acoustic wave traveling direction in the acoustic wave transmission path.

Further, in the above embodiment, the pipe member has the loop tube, and the first and second acoustic wave generators and the output unit are provided in the loop tube, but is not limited thereto. For example, the first and second acoustic wave generators may be provided in the loop tube, and the output unit may be provided in a straight tube portion as a resonance tube connected to the first and second acoustic wave generators. Further, for example, the first and second acoustic wave generators and the output unit may be provided in a straight tube without a loop tube portion.

Further, in the above embodiment, the thermoacoustic device which is the energy conversion device is applied to the air conditioner for a vehicle, but is not limited thereto. For example, it may be applied to a stationary air conditioner.

In the above embodiment, the cooler 50, which is the output unit, converts the acoustic energy into the cold energy to output the cold energy, however, is not limited to this. The output unit may convert the acoustic energy into energy other than the acoustic energy to output. For example, the output unit may be a heat pump similar to the cooler, to output the thermal energy from the high temperature end.

Further, for example, the output unit may be a generator, and the acoustic energy may be converted into electric energy to output.

What is claimed is:

1. An energy conversion device comprising:
   a pipe member including a working gas and a transmission path for an acoustic wave of the working gas;
   a first acoustic wave generator disposed in the pipe member, the first acoustic wave generator including a thermal energy generator configured to generate a first thermal energy from electric energy supplied from an electric power source, the first acoustic wave generator converting the first thermal energy generated by the thermal energy generator to an acoustic energy to generate the acoustic wave of the working gas by a self-excited thermo acoustic vibration;
   a second acoustic wave generator disposed in the pipe member, the second acoustic wave generator converting a second thermal energy supplied from a heat supply source to an acoustic energy to generate the acoustic wave of the working gas by a self-excited thermo acoustic vibration; and
   an output unit disposed in the pipe member, the output unit converting an acoustic energy of the acoustic waves from the first acoustic wave generator and the second acoustic wave generator to other energy other than the acoustic energy and outputting the other energy; and a power conversion device that converts power input and output relative to the electric power source; and
   a cooling medium circuit in which a liquid phase cooling medium circulates for cooling the power conversion device, the cooling medium circuit capable of discarding heat exhausted from the power conversion device to an outside of the cooling medium circuit, wherein
   the first acoustic wave generator and the second acoustic wave generator are configured to emit waste heat, which is not converted into the acoustic energy while emitted from the working gas, to the cooling medium circulating through the cooling medium circuit.

2. The energy conversion device according to claim 1, wherein
   the first acoustic wave generator and the second acoustic wave generator are arranged in series along a traveling direction of the acoustic wave in the transmission path, and
   the first acoustic wave generator is located upstream of the second acoustic wave generator in the traveling direction, a level of the acoustic energy in the transmission path being higher at a downstream end of the second acoustic wave generator than an upstream end of the first acoustic wave generator in the traveling direction.

3. The energy conversion device according to claim 2, wherein
   a first heating temperature, which is a heating temperature of the working gas by the first thermal energy in the first acoustic wave generator, is higher than a second heating temperature, which is a heating temperature of the working gas by the second thermal energy in the second acoustic wave generator.

4. The energy conversion device according to claim 1, wherein the second acoustic wave generator inputs the second thermal energy that is transported by a cooling medium that cools the heat supply source.

5. The energy conversion device according to claim 1, wherein the second acoustic wave generator inputs the second thermal energy that is transported by gas exhausted from the heat supply source.

6. The energy conversion device according to claim 1, further comprising: an exhaust heat recovery part configured to recover heat of gas exhausted from the heat supply source with a cooling medium that cools the heat supply source, wherein
   the second acoustic wave generator inputs heat acquired by cooling the heat supply source with the cooling medium and heat recovered by the exhaust heat recovery part as the second thermal energy.

* * * * *